L. EHRLICH.
Assignor to the AMERICAN ROLL PAPER COMPANY
ROLL PAPER HOLDER AND CUTTER.
No. 11,043. Reissued Nov. 19, 1889.
*Fig. I.*
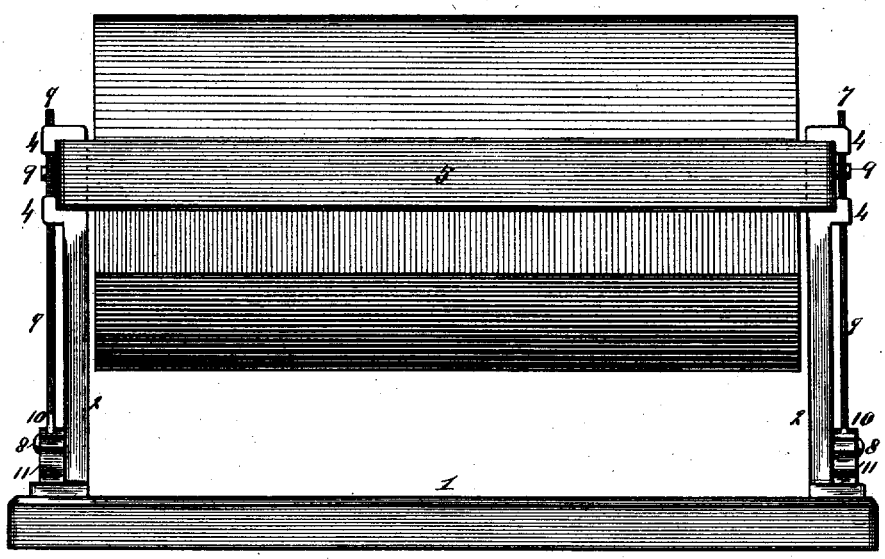
*Fig. II.*
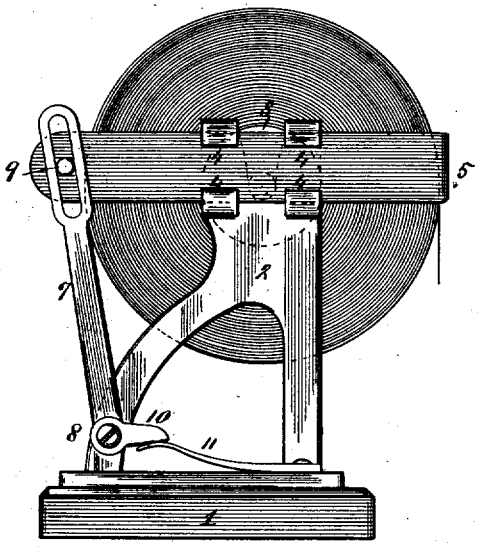
*Fig. III.*
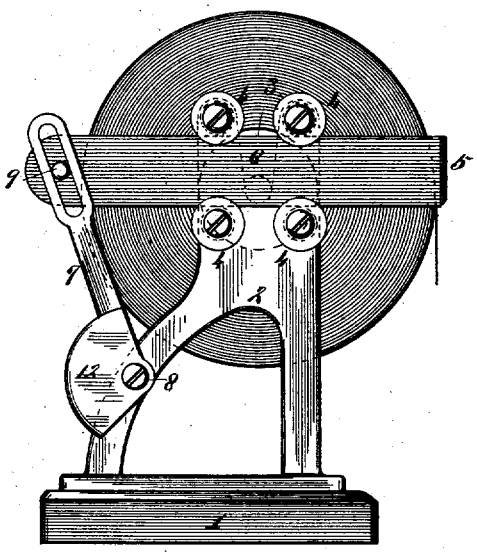
*Attest;*
H. S. Knight
E. Arthur
*Inventor;*
Leo Ehrlich
By Knight Bros.
Atty's
N. PETERS, Photo-Lithographer, Washington, D. C.

UNITED STATES PATENT OFFICE.

LEO EHRLICH, OF ST. LOUIS, MISSOURI, ASSIGNOR TO THE AMERICAN ROLL PAPER COMPANY, OF SAME PLACE.

ROLL-PAPER HOLDER AND CUTTER.

SPECIFICATION forming part of Reissued Letters Patent No. 11,043, dated November 19, 1889.

Original No. 388,651, dated August 28, 1888. Application for reissue filed January 22, 1889. Serial No. 297,226.

*To all whom it may concern:*

Be it known that I, LEO EHRLICH, of the city of St. Louis, in the State of Missouri, have invented a certain new and useful Improvement in Roll-Paper Holders and Cutters, of which the following is a full, clear, and exact description, reference being had to the accompanying drawings, forming part of this specification, and in which—

Fig. I is a side elevation of my improved paper holders and cutters. Fig. II is an end view, and Fig. III is an end view showing a modification.

My invention relates to an improvement in paper holders and cutters; and my invention consists in features of novelty hereinafter fully described, and pointed out in the claims.

Referring to the drawings, 1 represents a suitable base, and 2 ends or standards secured to the base and in which the roller 3 is journaled.

4 represents lugs on the ends or standards, and 5 the knife, having ends 6, which are preferably formed in one piece with the knife, and which fit loosely in the lugs 4. The knife is arranged in or substantially in a horizontal position.

7 represents arms pivoted at 8 to the ends or standards, and which have slot-and-pin connection 9 with the ends 6 of the knife. On the arms are projections 10, against which press or bear springs 11, as shown in Fig. II. The tendency of the springs is to move the upper ends of the arms outward, and thus cause the knife to be moved toward the roller as the paper is taken off. I prefer to connect the springs 11 to the ends or standards 2, with their free ends pressing upward on the projections 10, which are located on the lower ends of the arms 7.

In Fig. III, I have shown a modification, wherein the lugs 4 are made in the form of friction-rollers journaled to the ends 2, and in place of the springs 11 a counter-balance 12 is located on the lower end of each arm 7.

I do not broadly claim herein the feature of the knife being held to the roll of paper by weighted pivoted arms, nor a knife held against the roll automatically by means of weights, nor arms pivoted to standards with a knife on their outer ends and weights on their inner ends, as these features, broadly considered, form the subject-matter of my application, Serial No. 281,166, filed July 27, 1888.

I claim as my invention—

1. In combination with the ends or standards in which the roller is journaled, lugs on the ends or standards, a knife having end portions fitting in the lugs in a horizontal position, arms having slot-and-pin connection with the ends of the knife, and a spring or weight for operating the arms, substantially as and for the purpose set forth.

2. In a paper-cutter, the combination of the ends provided with lugs 4, arranged in horizontal series, as shown, roller journaled in the ends, knife provided with ends fitting in the lugs, lever pivoted to the ends or standards and having slot-and-pin connection with the ends of the knife, projections on the arms, and springs connected to the ends or standards, the free ends of which bear against the projections on the arms, substantially as and for the purpose set forth.

LEO EHRLICH.

In presence of—
GEO. H. KNIGHT,
EDW. S. KNIGHT.